2,992,196
POLYEPOXIDE-DICARBOXYLIC ANHYDRIDE COMPOSITIONS

Charles S. Ilardo, Tonawanda, Claude T. Bean, Niagara Falls, and Paul Robitschek, Wilson, N.Y., assignors to Hooker Chemical Corporation, Niagara Falls, N.Y., a corporation of New York
No Drawing. Filed Apr. 30, 1958, Ser. No. 731,879
13 Claims. (Cl. 260—18)

This invention relates to novel resinous compositions of matter having good physical properties, and to a process for obtaining them. More particularly this invention relates to compositions of matter comprising (1) a polyepoxide which has greater than one non-terminal epoxide group per molecule, and which is derived from naturally occurring vegetable oils or their derivatives, and (2) 1,4,5,6,7,7 - hexachlorobicyclo - (2.2.1) - 5 - heptene - 2,3-dicarboxylic anhydride. Dibasic acids, dihydric alcohols or mixtures thereof, particularly dihydric phenols may be co-reacted into the above composition to obtain improved results.

Conventionally, polyepoxides containing 1,2, epoxy groups (terminal epoxy groups) may be reacted with carboxylic anhydrides, amines and many other compounds, to obtain cured, hard, resinous compositions. It would be advantageous to replace the compounds having terminal epoxy groups with those containing non-terminal epoxy groups and which are derived from naturally occurring vegetable oils or their derivatives. The latter class of compounds in general can command a lower price than those containing terminal epoxy groups. These non-terminal polyepoxides in general have not been used in the art because when they are reacted with conventional epoxy hardeners at best rubbery products which are of only doubtful value are obtained.

It is, therefore, an object of the present invention to obtain a hard, useful resinous composition from non-terminal polyepoxides derived from naturally occurring vegetable oils or their derivatives. It is an object of the present invention to obtain these products without the necessity of a catalyst or other activator. It is a further object of the present invention to obtain a rigid, cured product having good electrical properties, good flame-retardant properties and improved physical characteristics. Other objects of the present invention will appear herein.

In accordance with the present invention, it has been found that cured, tough resinous products may be obtained by reacting together a polyepoxide which has greater than one non-terminal epoxide group per molecule, and which is derived from naturally occurring vegetable oils or their derivatives, and 1,4,5,6,7,7-hexachlorobicyclo-(2.2.1)-5-heptene-2,3-dicarboxylic anhydride. It has been further found that the above compositions may be prepared without the necessity of a catalyst or other activator. It has been further found that dibasic acids, dihydric alcohols, or mixtures thereof, particularly dihydric phenols, may, if desired, be co-reacted into the polyepoxide before hardening, thereby promoting ease of hardening and obtaining improved heat distortion characteristics. The cured products of the present invention, whether with or without dibasic acid or dihydric alcohol incorporated therein, are characterized by improved hardness, flame retardance, high temperature strength, good electrical insulation characteristics, and other good physical properties.

If the polyepoxide material consists of a single compound and all of the epoxide groups are intact, the average number of epoxide groups per molecule will be an integer, such as 2,3 or 4, etc. However, the polyepoxide may be a mixture of chemical compounds or some of the epoxy groups may be hydrated or otherwise reacted, so that the average number of epoxy groups per molecule will not necessarily be an integer, but may be a fractional value which is greater than one, as 3.2.

Examples of the non-terminal polyepoxides derived from naturally occurring vegetable oils or their derivates contemplated by the present invention include: epoxidized triglycerides such as epoxidized soyabean oil, epoxidized linseed oil, epoxidized cottonseed oil, epoxidized olive oil, epoxidized caster oil, epoxidized corn oil, epoxidized sunflower oil, epoxidized glycerol trioleate, epoxidized glycerol trilinoleate, epoxidized glycerol trilinolenate, etc.; epoxidized diglycerides such as epoxidized glycerol dioleate, epoxidized glycerol dilinoleate, epoxidized glycerol dilinolenate, etc.; epoxidized monoglycerides such as epoxidized glycerol monolinoleate, epoxidized glycerol monolinolenate, etc.; alkyl esters of epoxidized fatty acids such as epoxidized methyl linoleate, epoxidized methyl linolenate, epoxidized ethyl linoleate, etc.; and so forth.

The non-terminal epoxy compounds contemplated by the present invention may be prepared by methods known to the art. They may for example, be prepared by agitating the compound to be epoxidized with peracetic acid solution, prepared from glacial acetic acid, thirty percent hydrogen peroxide and one percent sulfuric acid catalyst. The agitation should be continued for several hours at an elevated temperature. The resulting non-terminal epoxy compounds may, if desired, be subsequently purified.

The anhydride used in the present invention, 1,4,5,6,7,7-hexachlorobicyclo-(2.2.1)-5-heptene-2,3-dicarboxylic anhydride, is the Diels-Alder adduct of hexachlorocyclopentadiene as the diene and maleic anhydride as the dienophile and can be represented structurally as follows:

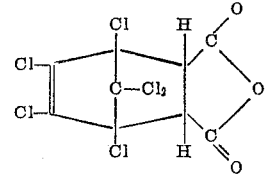

The compositions of the present invention may be prepared by reacting from about 0.4 mole to about 1.6 moles of the anhydride for each epoxide group in the polyepoxide resin. Optimum results are obtained when from about 0.7 to about 1.3 moles of anhydride are employed per epoxide group.

The method by which the anhydride and the polyepoxide can be combined depends upon the particular application desired; in general however, it is merely necessary to add the solid anhydride to the polyepoxide to effect solution, preferably at an elevated temperature, and thereafter heat the mixture to a temperature ranging between about one hundred degrees centigrade and about two hundred degrees centigrade, with optimum results being obtained between about one hundred and fifty degrees centigrade and about one hundred and eighty degrees centigrade. Temperatures over two hundred degrees centigrade are undesirable due to decomposition reactions of the product. The time of reaction may be varied within a wide range depending upon the ingredients employed, the temperature of reaction and the degree of cure desired.

Upon addition of the anhydride to the polyepoxide the liquid reaction mixture may be poured into molds, with subsequent conversion to hard, durable and flame-retardant products upon further heating. In addition the compositions of the present invention find utility in the preparation of laminates when used in conjunction with suitable reinforcements. The compositions of the present invention also find utility wherever it is desired to obtain cured, resinous reaction products which are flame retardant and are characterized by good hardness, high temperature strength, durability and good water resistance. In addition, the products of the present invention are characterized by good electrical properties.

Dibasic acids or dihydric alcohols, or mixtures thereof, preferably dihydric phenols, may be incorporated into the compositions of the present invention. Examples of dihydric alcohols include 2,2'-bis(4-hydroxyphenyl)-propane (bisphenol A); 2,2'-bis(3,5-dichloro-4-hydroxyphenyl)-propane; dihydroxyphenylsulfone; 2,2'-bis(4-hydroxyphenol)-butane; 4,4'-dihydroxybenzophenone; bis-(4-hydroxyphenyl)-ethane; 2,2'-bis(4-hydroxyphenyl)-pentane; 1,5-dihydroxynaphthalene; resorcinol; catechol; hydroquinone; methyl resorcinol; diethylene glycol; triethylene glycol; dipropylene glycol; neopentyl glycol; ethylene glycol; propylene glycol; etc. Examples of dibasic acids include: adipic acid; sebacic acid; phthalic acid; azelaic acid; and succinic acid.

The dibasic acids or dihydric alcohols may be pre-reacted with the polyepoxide by merely dissolving in the polyepoxide and stirring the ingredients together for at least one hour at a temperature between about one hundred and fifty degrees and two hundred and fifty degrees centigrade. Approximately one mole of dibasic acid or dihydric alcohol is employed to between about one to three moles of polyepoxide. The reaction product thus obtained may then be cooled to room temperature and stored indefinitely at room temperature. When the final product is desired, the reaction product may be heated and the anhydride added.

Alternatively, the ingredients may be added together without pre-reacting the dihydric alcohol or the dibasic acid and the polyepoxide. This is done by adding the anhydride immediately after dissolving the dihydric alcohol or dibasic acid in the polyepoxide.

The epoxy-anhydride ratio is the same as without dihydric alcohol or dibasic acid, i.e., from about 0.4 mole to about 1.6 moles of anhydride per epoxide group, and preferably from about 0.7 to about 1.3 moles of anhydride per epoxide group.

Upon the addition of the anhydride, heat is applied at between about one hundred degrees centigrade and about two hundred degrees centigrade with optimum results being obtained between about one hundred and twenty degrees centigrade and about one hundred and sixty degrees centigrade. Temperatures over two hundred degrees centigrade are undesirable due to decomposition reactions of the product. The time of reaction may be varied within a wide range depending on the ingredients employed, the temperature of reaction and the degree of cure desired.

The cured product is characterized by a high degree of flame retardance, good physical characteristics and improved high temperature strength over the resinous products without dibasic acids or dihydric alcohols co-reacted therein. The reason for this improvement in high temperature strength is not fully understood. In addition, the reaction proceeds more expeditiously and with a lower optimum temperature. It is speculated that the high degree of reactivity of these compounds accounts for the increased rate of reaction and lower optimum temperatures.

The product having dibasic acid or dihydric alcohol incorporated therein finds utility coextensive as that without dibasic acid or dihydric alcohol co-reacted therein.

It is to be understood that the compositions of the present invention can be used in admixture with compounding ingredients, such as fillers, stabilizers, colorants, plasticizers, etc.

In order that those skilled in the art may have sufficiently detailed instructions in practicing the process and preparing the compositions of the present invention, the following examples will illustrate typical procedures. This detailed disclosure is not to be construed at limiting the scope of the present invention as further indicated elsewhere herein.

*Example 1*

Eleven point four parts of 2,2'-bis(4-hydroxyphenyl)-propane (bisphenol A) were dissolved in 93.6 parts of epoxidized soyabean oil, at a temperature of about ninety degrees centigrade. The epoxidized soyabean oil has an average of 3.6 epoxide groups per molecule. The molar ratio was one mole of bisphenol A to two moles of polyepoxide. One hundred parts of solid 1,4,5,6,7,7-hexachlorobicyclo-(2.2.1)-5-heptene-2,3-dicarboxylic anhydride, (0.7 mole of anhydride per epoxide group) prepared by the Diels-Alder reaction of hexachlorocyclopentadiene as the diene and maleic anhydride as the dienophile, were added to one hundred parts of the bisphenol A- epoxidized soyabean oil solution and heated to between about one hundred and twenty and one hundred and forty degrees centigrade to effect solution. The solution was then cured for twenty-four hours at one hundred and forty degrees centigrade. The resulting product was hard and possessed excellent physical characteristics as follows:

| | |
|---|---|
| Specific gravity (23/23) | 1.340 |
| Heat distortion temperature (264 p.s.i.) | 85° C. |
| Water resistance (24 hours) | 0.09% |
| Fire resistance | Self-extinguishing |
| Flexural strength | 11,320 p.s.i. |
| Flexural modulus | $3.0 \times 10^5$ p.s.i. |
| Tensile strength | 6390 p.s.i. |
| Tensile modulus | $4.3 \times 10^5$ p.s.i. |
| Compressive strength | 9630 p.s.i. |
| Dielectric strength: | |
| (s/t) | 410 volts/mil |
| (s/s) | 394 votls/mil |
| Dielectric constant: | |
| (1 mc.) (cond. A) | 2.87 |
| (D48–50) | 2.96 |
| Dissipation factor: | |
| (1 mc.) (cond. A) | 0.0089 |
| (D48–50) | 0.0125 |
| Volume resistivity | $1.8 \times 10^{16}$ ohms/cm. |
| Surface resistivity | $1.7 \times 10^{15}$ ohms |
| Arc resistance | 7 seconds |

*Example 2*

In a manner after Example 1, 5.5 parts of hydroquinone were dissolved in 93.6 parts of epoxidized soyabean oil, at a temperature of about one hundred and twenty degrees centigrade. The epoxidized soyabean oil has an average of 3.6 epoxide groups per molecule. The molar ratio was one mole of hydroquinone to two moles of polyepoxide. One hundred parts of solid 1,4,5,6,7,7-hexachlorobicyclo-(2.2.1)-5-heptene-2,3-carboxylic anhydride (0.7 mole of anhydride per epoxide group) were added to the above solution. The above solution was then heated to between about one hundred and twenty and one hundred and forty degrees centigrade to effect solution and cured for twenty-four hours at one hundred and forty degrees centigrade. The resulting product was hard and possessed excellent physical characteristics comparable to those in Example 1.

*Example 3*

In a manner after Example 1, 3.1 parts of ethylene glycol were mixed with 93.6 parts of epoxidized soyabean oil, at room temperature. The epoxidized soyabean oil has an average of 3.6 epoxide groups per molecule. The molar ratio was one mole of ethylene glycol to two moles of polyepoxide. One hundred parts of solid 1,4,5,6,7,7-hexachlorobicyclo-(2.2.1)-5-heptene-2,3-carboxylic anhydride, (0.7 mole of anhydride per epoxide group) were added to the above solution. The above solution was then heated to between about one hundred and twenty and one hundred and forty degrees centigrade to effect solution and cured for twenty-four hours at one hundred and forty degrees centigrade. The resulting product was hard and possessed excellent physical characteristics comparable to those in Example 1.

*Example 4*

In a manner after Example 1, 5.5 parts of resorcinol were dissolved in 93.6 parts of epoxidized cottonseed oil, at a temperature of about one hundred and twenty degrees centigrade. The epoxidized cottonseed oil has an average of 3.6 epoxide groups per molecule. The molar ratio was one mole of resorcinol to two moles of polyepoxide. One hundred parts of solid 1,4,5,6,7,7-hexachlorobicyclo-(2.2.1)-5-heptene-2,3-carboxylic anhydride (0.7 mole of anhydride per epoxide group) were added to the above solution. The above solution was then heated to between about one hundred and twenty and one hundred and forty degrees centigrade to effect solution and cured for twenty-four hours at one hundred and forty degrees centigrade. The resulting product was hard and possessed excellent physical characteristics comparable to those in Example 1.

*Example 5*

One hundred parts of solid 1,4,5,6,7,7-hexachlorobicyclo-(2.2.1)-5-heptene-2,3-dicarboxylic anhydride (0.7 mole of anhydride per epoxide group) were added to one hundred parts of liquid epoxidized soyabean oil, having an average of 3.6 epoxide groups per molecule. The mixture was heated with stirring at between about one hundred and twenty and one hundred and forty degrees centigrade to effect solution. The solution was then cured for twenty-four hours at one hundred and fifty degrees centigrade, followed by twenty-four hours at one hundred and eighty degrees centigrade. The resultant product was found to be hard, possessed a heat distortion temperature of sixty-three degrees centigrade and possessed excellent physical characteristics comparable to those in Example 1.

*Example 6*

One hundred parts of solid 1,4,5,6,7,7-hexachlorobicyclo-(2.2.1)-5-heptene-2,3-dicarboxylic anhydride (0.7 mole of anhydride per epoxide group) were added to one hundred parts of liquid epoxidized linseed oil, having an average of 4.8 epoxide groups per molecule. The mixture was heated with stirring at between about one hundred and twenty and one hundred and forty degrees centigrade to effect solution. The solution was then cured for twenty-four hours at one hundred and fifty degrees centigrade, followed by twenty-four hours at one hundred and eighty degrees centigrade. The resultant product was found to be hard and possessed excellent physical characteristics comparable to those in Example 5.

*Example 7*

Seven point two parts of adipic acid were added to 93.6 parts of epoxidized soyabean oil, having an average of 3.6 epoxide groups per molecule. The molar ratio was one mole of adipic acid to two moles of polyepoxide. The mixture was heated to between about one hundred and thirty and one hundred and forty degrees centigrade to effect solution. One hundred parts of solid 1,4,5,6,7,7-hexachlorobicyclo-(2.2.1)-5-heptene-2,3-dicarboxylic anhydride (0.7 mole of anhydride per epoxide group) were dissolved in one hundred parts of the above solution at between about one hundred and thirty and one hundred and forty degrees centigrade. The resultant solution was cured for twenty-four hours at about one hundred and fifty degrees centigrade to give a hard product with excellent physical characteristics comparable to those in Example 1.

*Comparative Example 8*

Eleven point four parts of bisphenol A were dissolved in 93.6 parts of epoxidized soyabean oil at about ninety degrees centigrade. The epoxidized soyabean oil has an average of 3.6 epoxide groups per molecule. The molar ratio was one mole of bisphenol A to two moles of polyepoxide. Fifty parts of hexahydrophthalic anhydride, (0.87 mole of anhydride per epoxide group) were mixed with one hundred parts of the above mixture and cured at twenty-four hours at one hundred and fifty degrees centigrade. Rubbery products of little economic value were obtained.

This invention may be embodied in other forms or carried out in other ways without departing from the spirit of essential characteristics thereof. The present embodiment is, therefore, to be considered as in all respects, illustrative and not restrictive, the scope of the invention being indicated by the appended claims and all changes which come within the meaning and range of equivalency are intended to be embraced therein.

We claim:

1. A composition of matter comprising a polyepoxide which has greater than one non-terminal epoxide group per molecule and which is derived from naturally occurring glyceride vegetable oils, a constituent selected from the group consisting of organic dibasic acids, organic dihydric alcohols and mixtures thereof, and 1,4,5,6,7,7 - hexachlorobicyclo - (2.2.1) - 5 - heptene - 2,3-dicarboxylic anhydride.

2. A composition according to claim 1 when cured to an infusible, insoluble, resinous composition.

3. A composition according to claim 1 wherein the polyepoxide is epoxidized linseed oil.

4. A composition according to claim 1 wherein the polyepoxide is epoxidized cottonseed oil.

5. A composition according to claim 1 wherein the polyepoxide is epoxidized soyabean oil.

6. A composition according to claim 5 wherein a dihydric alcohol is employed.

7. A composition according to claim 6 wherein the dihydric alcohol is 2,2'-bis(4-hydroxyphenyl)-propane.

8. A composition according to claim 5 wherein a dibasic acid is employed.

9. A composition according to claim 8 wherein the dibasic acid is adipic acid.

10. A process for producing a resinified product which comprises reacting together a polyepoxide which has a greater than one non-terminal epoxide group per molecule and which is derived from naturally occurring glyceride vegetable oils, a constituent selected from the group consisting of organic dibasic acids, organic dihydric alcohols and mixtures thereof, and 1,4,5,6,7,7-hexachlorobicyclo-(2.2.1)-5-heptene-2,3-dicarboxylic anhydride at a temperature between about one hundred degrees centigrade and about two hundred degrees centigrade.

11. A process according to claim 10 wherein the polyepoxide is epoxidized soyabean oil.

12. A process according to claim 11 wherein a dihydric alcohol is employed.

13. A process according to claim 12 wherein the dihydric alcohol is 2,2'-bis-(4-hydroxyphenyl)-propane.

References Cited in the file of this patent

UNITED STATES PATENTS

| | | |
|---|---|---|
| 2,768,153 | Shokal | Oct. 23, 1956 |
| 2,890,196 | Phillips et al. | June 9, 1959 |

OTHER REFERENCES

Lee et al.: "Epoxy Resins," McGraw-Hill Book Co., Inc. N.Y., 1957, pp. 136–139 relied on.